H. J. CHILDS.
Coffee-Pot.
No. 134,515.  Patented Jan. 7, 1873.
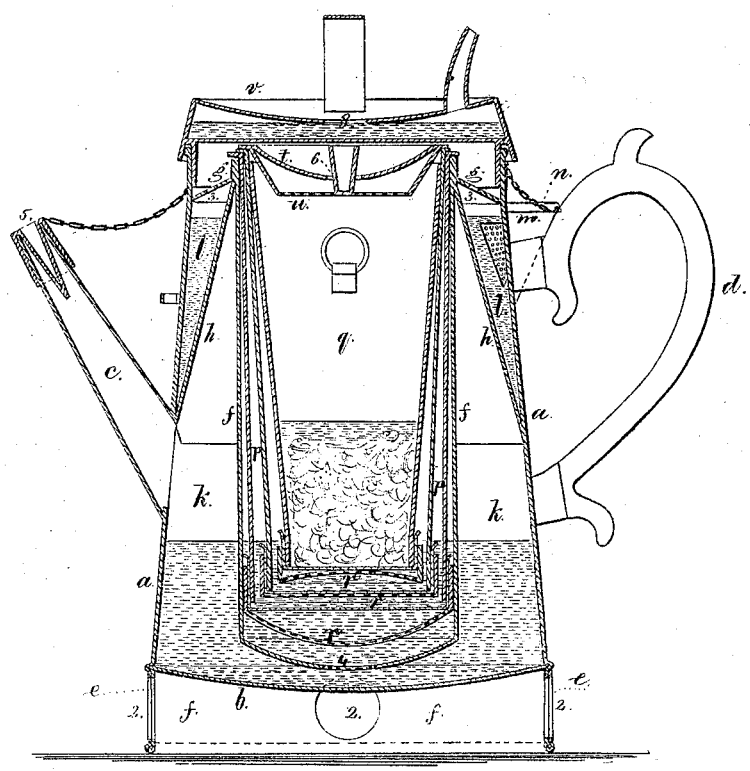

UNITED STATES PATENT OFFICE.

HENRY J. CHILDS, OF NEW YORK, N. Y.

IMPROVEMENT IN COFFEE-POTS.

Specification forming part of Letters Patent No. 134,515, dated January 7, 1873.

*To all whom it may concern:*

Be it known that I, HENRY J. CHILDS, of the city and State of New York, have invented an Improvement in Coffee-Pots, of which the following is a specification:

This coffee-pot is made for retaining all the particles of coffee, and only allowing the extract to pass into the pot, at the same time keeping the upper portion of the coffee-pot closed to retain the aroma, and heated to the required temperature.

In the drawing I have represented said coffee-pot by a vertical section.

The vessel is made externally with the sides $a$, bottom $b$, spout $c$, and handle $d$, of usual character. I prefer that the bottom $b$ shall be convex; and to support the coffee-pot the rim $f$ is employed, in which are perforations 2, to allow the heat to circulate or pass out while the pot is upon a stove, and a sliding ring, $e$, is provided for closing these openings and regulating the heat, as desired. Within the vessel ($a$ $b$) is a cylinder, $f$, that is supported by a flange or ring-connection, $g$, to the inside of the vessel $a$, and there is also an intermediate conical partition, $h$, that separates the coffee-space $k$ from the hot-water space $l$. There is a filling-cup, $m$, at one side, through which hot water is poured to warm up the coffee-pot and maintain the necessary heat. A cover, $n$, is provided for this cup $m$, and there are vent-holes at 3 through the ring $g$. Within the cylinder $f$ is a strainer, 4, at the bottom thereof, and I insert two or more cylinders, $p$, at the bottom of which a piece of muslin or flannel is applied, and retained by the band around the strainer $r$. The object of these fibrous septums and strainers is to retain any fine particles of coffee or deleterious substances. There is a sprinkler and cap combined for the coffee-receptacle $q$. This is made with an opening at 6 through the cover $t$, and the perforated bottom $u$ serves to spread the hot water equally over the coffee as said hot water is poured through the sprinkler upon the same.

It is preferable to close the spout $c$ with a stopper, 5, previous to pouring in the hot water, so that the extract may not run away until the stopper is removed, after which the extract will pass down into the pot as the air escapes by the spout. This is to be repeated until the coffee extract is made, after which the grounds may be removed and the strainers washed.

During the operation of extracting, the temperature of the apparatus may be maintained by the hot water introduced into the space $l$. The cover $v$ of the coffee-pot is made double, with an opening at 8, into which cold water is poured, and a spout allows for emptying. When the coffee is being made, this cover $v$ retains the steam and causes its condensation, and at the same time excludes the atmosphere. The vapors passing off generally contain deleterious substances, which condense, and, instead of running back into the coffee extract, drop from the rim of the lid and escape into the hot water in the space $l$.

This pot may be used for tea or for making any other extract.

I claim as my invention—

The vessel $a$ $b$, containing the partition $h$, hot-water space $l$, and cylinder $f$, in combination with the cylinders $p$ $q$, strainers $r$, and cover $t$ $u$, as and for the purposes set forth.

Signed by me this 15th day of November, 1872.

HENRY J. CHILDS.

Witnesses:
 GEO. T. PINCKNEY,
 CHAS. H. SMITH.